March 26, 1929.  H. N. OTT  1,706,897
PROJECTION APPARATUS
Filed July 17, 1924    3 Sheets-Sheet 1
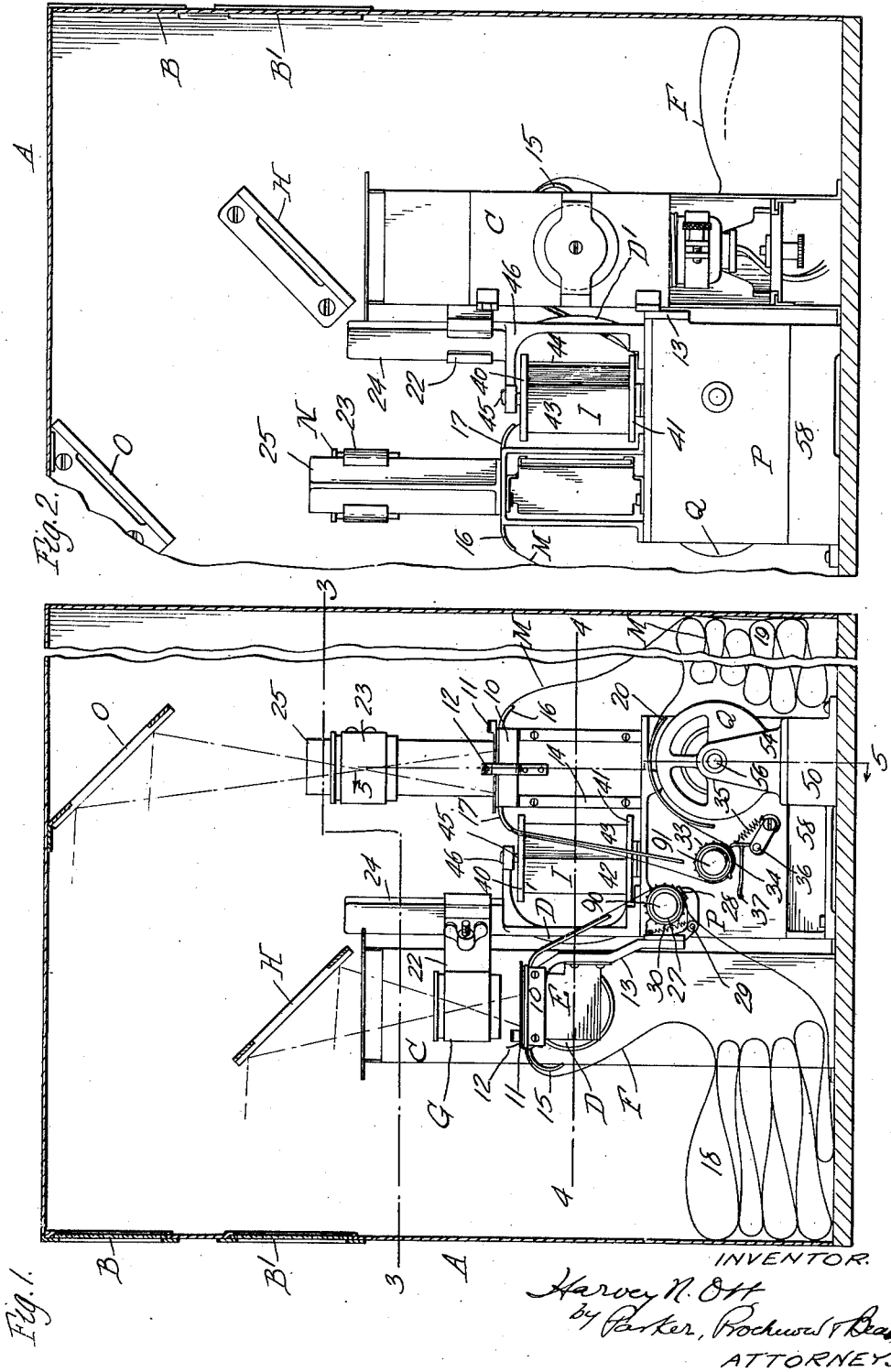

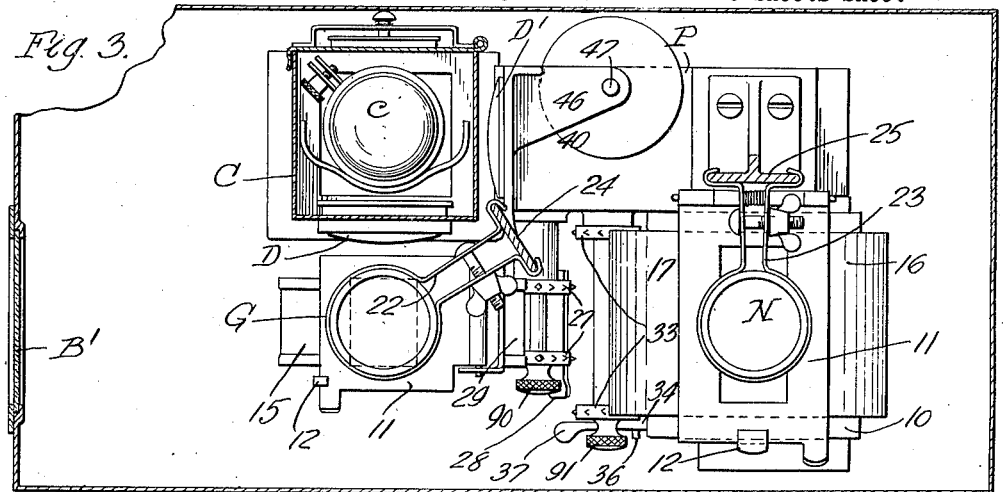
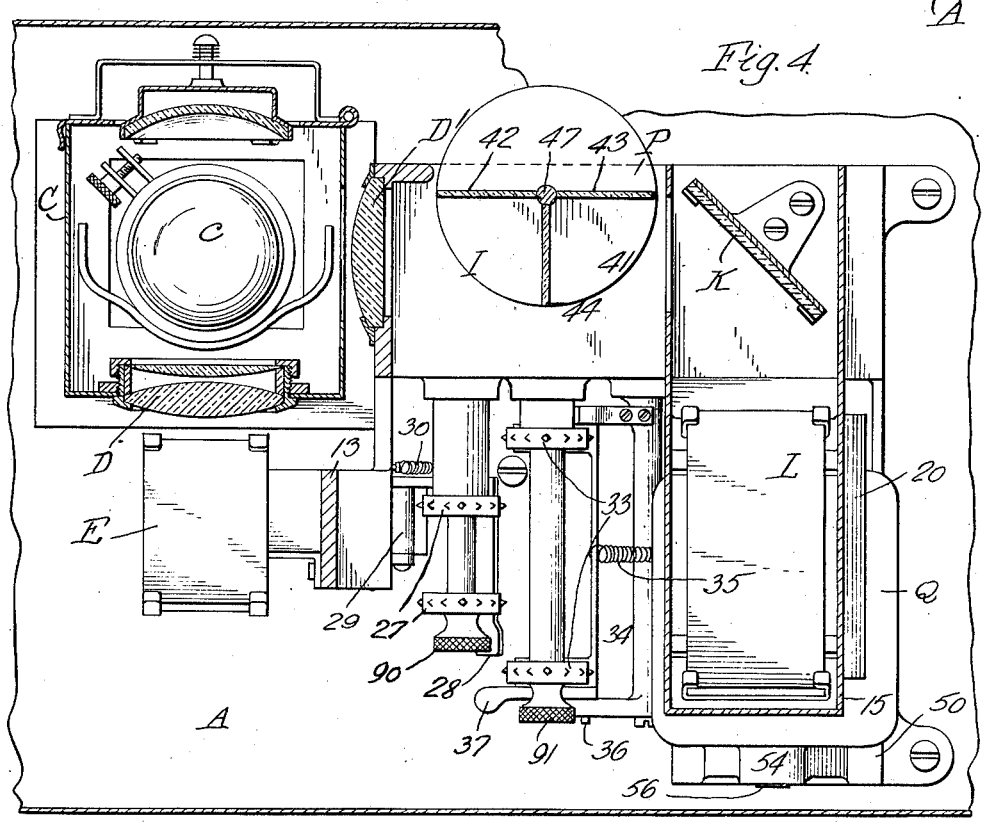

March 26, 1929.     H. N. OTT     1,706,897
PROJECTION APPARATUS
Filed July 17, 1924    3 Sheets-Sheet 3
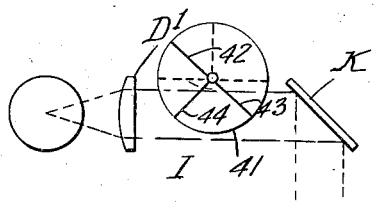
Fig. 7
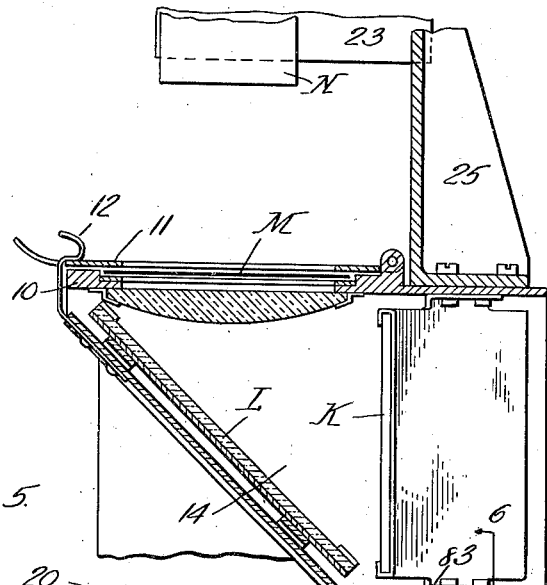
Fig. 5.
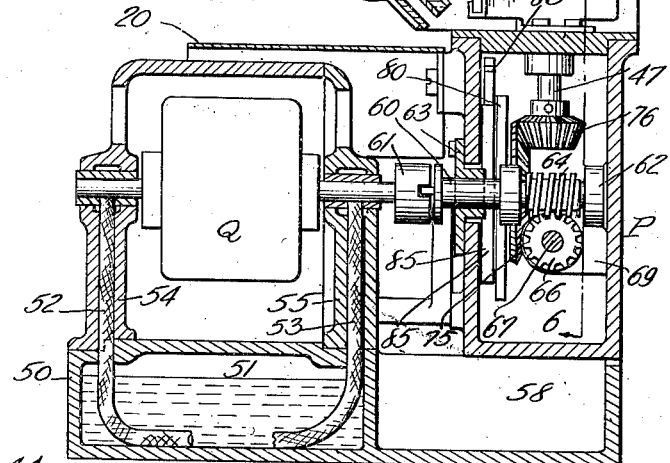
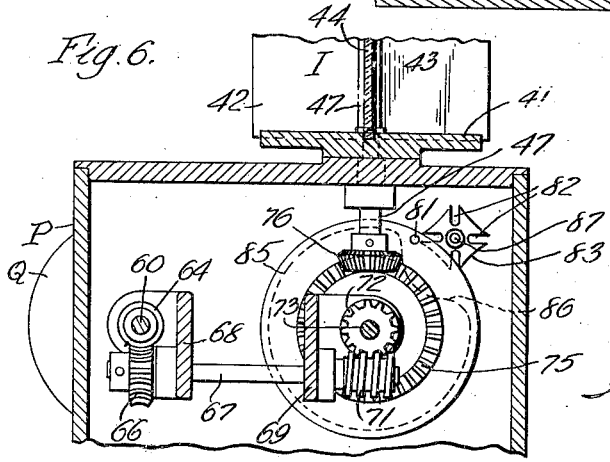
Fig. 6.
INVENTOR.
Harvey N. Ott
by Parker, ...
ATTORNEYS.

Patented Mar. 26, 1929.

1,706,897

UNITED STATES PATENT OFFICE.

HARVEY N. OTT, OF BUFFALO, NEW YORK, ASSIGNOR TO SPENCER LENS CO., OF BUFFALO, NEW YORK.

PROJECTION APPARATUS.

Application filed July 17, 1924. Serial No. 726,625.

This invention relates to improvements in projection apparatus.

One object of this invention is to provide a projection apparatus which is adapted to project more than one subject carrier at one time, for example, the apparatus may project at the same time a picture and a description or title of the picture, on the same screen, or on different screens arranged near each other. Other objects are to provide an apparatus of this kind which automatically changes the subject carriers or portions thereof to be presented; also to provide an apparatus of this kind in which the mechanism for changing the several subject carriers is so constructed that the proper subject carriers are presented simultaneously, for example, when a picture is changed, the description or title of the picture will be changed to correspond with the newly presented picture; also to provide an apparatus of this kind in which the same source of illumination supplies light for both projections; also to provide an apparatus of this kind with means of improved construction for projecting either or both subject carriers by means of light of varying color; also to provide an apparatus for changing the pictures at intervals and in which the reading matter moves continuously across the screen; also to provide an apparatus of this kind which is constructed to operate at high efficiency so that both subject carriers will be presented as clearly as possible; also to provide mechanism of improved construction for placing the subject carriers in position to be projected, which mechanism is designed to operate indefinitely without requiring attention; also to improve the construction of apparatus of this kind in the other respects hereinafter specified.

In the accompanying drawings:

Fig. 1 is a side elevation of a projection apparatus embodying the invention, the side wall of the housing of the apparatus being omitted to show the mechanism inside thereof.

Fig. 2 is a similar view of the opposite side of the apparatus.

Fig. 3 is a sectional plan view thereof on line 3—3, Fig. 1.

Fig. 4 is a plan view thereof on an enlarged scale on line 4—4, Fig. 1.

Fig. 5 is a transverse sectional elevation thereof on line 5—5, Fig. 1.

Fig. 6 is a fragmentary sectional elevation thereof on line 6—6, Fig. 5.

Fig. 7 is a diagrammatic view showing the relation of the color screen to the path of light.

In the specification and claims the term "subject carrier" is used to designate that element from which the image is projected on the screen or screens and is intended to cover opaque objects and stencils as well as the usual films or glass plates or lantern slides. The drawings illustrate the projection apparatus as used in connection with an advertising device in which a translucent or semi-transparent screen is employed, but it will be understood that it is not intended to limit the invention to use in connection with advertising devices nor to use in connection with translucent or semi-transparent screens, since the subject matter may be projected on any other screen if desired.

In the particular embodiment of this invention shown in the accompanying drawings, A represents a case or housing in which the projection apparatus is contained, and this case or housing may be of any suitable or desired construction, and is provided at the front side thereof with one or more screens B B' upon which the subject matter is projected, these screens being of a semi-transparent or translucent type so that the screens are interposed between the projection apparatus and the observer. The casing A may be provided with the usual door or opening, not shown, to afford access to the apparatus contained in the housing.

Briefly stated, the projection apparatus shown in the drawings includes a light house C having a lamp or other source of illumination $c$ arranged therein. Light passes out of the light house from two sides thereof through condenser lenses D and D'. The light from the condenser D passes to an inclined reflector E by means of which the light is projected upwardly through one of the subject carriers, which in the construction shown is in the form of an endless band or film F. The light passing through the transparency, next passes through an objective lens or lenses G to a reflector H by means of which it is reflected to the screen B'. Light passing through the other condenser D' may first, if desired, be passed through a rotary color screen I and is then reflected by two reflectors K and L and passes through the other subject carrier M which is also in the form of an endless film or band. The light passing through the subject carrier M is projected through an objective lens or lenses N and is reflected by the mirror or reflector O to the other screen B.

When the invention is used in connection with an advertising device, one of the subject carriers is preferably in the form of a film having pictures thereon, and this film is moved intermittently so that each picture will be presented for a definite interval of time. The other subject carrier is in the form of a stencil and may be made of paper or other opaque material having reading matter stencilled therein, and this stencil preferably moves continuously in a direction at right angles to the direction of the lines of reading matter at a rate which enables a person to readily read the subject matter which is projected. This subject carrier is preferably so arranged that the lines of reading matter which are projected on the screen B' will move from the bottom to the top of the screen at a convenient rate of speed. In the particular construction shown, F is the picture film which is moved intermittently, and M represents the stencil or film carrying the reading matter and which moves continuously across its light path. The actuation of the two subject carriers is effected by means of a mechanism contained in a gear housing or casing P, and the power for moving the transparencies is provided by an electric motor or other suitable source of power indicated by Q.

It will be noted that those portions of the films or stencils which are being projected are arranged horizontally and this arrangement has been particularly desirable for use in projecting a plurality of subject carriers from a single light source, since by this horizontal arrangement of the films or stencils and of the lenses and reflectors, the projection of the subject carriers can be effected with the least loss of light. In the particular construction illustrated the films or subject carriers F and M are drawn over tables or supports 10 and are held flat and in proper position to be projected by means of hinged frames 11 arranged directly above the tables 10 and adapted to be swung upwardly to permit the subject carrier to be removed, spring clips 12 serving to yieldingly hold the swinging or pivoted frames 11 in their operative relations to the table 10. The table 10 which cooperates with the subject carrier or band F is supported from the gear case P by means of a support or bracket 13, and the table which cooperates with the subject carrier M is supported from the frame or gear case by means of straps or brackets 14. 15 represents a curved guide or guard which insures the proper feeding of the film or subject carrier F into the space between the table and the hinged frame 11, and the other table 10 is provided with similar guides or guards 16 and 17.

The particular device shown in the drawings is intended to operate on subject carriers in the form of endless bands or strips and these endless strips collect in folds 18 and 19 in the bottom of the case. The subject carrier M is preferably also guided over the motor Q by means of a curved guide or guard member 20. It will be understood, however, that it is not intended to limit this invention to use in connection with endless subject carriers.

The reflectors H and O in the construction shown are suitably mounted on the casing or housing A of the device, and the objectives G and N are arranged in brackets or arms 22 and 23 respectively which are secured, preferably adjustably, to upright posts or standards 24, 25, suitably secured to or formed integral with the gear case or frame P of the apparatus. Any other means for mounting the objectives or reflectors in proper relation to the other parts of the apparatus may be provided if desired.

The subject carrier F is drawn through the space between the table 10 and the frame 11, by means of intermittently movable sprocket wheels 27 which cooperate with the usual presser or guard 28 for holding the film or band F in engagement with the teeth of the sprocket wheels 27. The guard 28 is mounted on an arm pivoted at 29 on a fixed part of the frame of the machine, and a spring 30 normally holds the guard in engagement with the sprocket wheel 27. Any other means for holding the subject carrier in engagement with the sprocket wheel may be employed if desired. Since each picture of the film or band is presented to the screen for a considerable interval of time, no shutter mechanism is necessary for use in connection with this apparatus, and after a picture has been presented for the desired period of time, the intermittent rotation of the sprocket wheel 27 simply draws the picture across the light opening until the next picture is in position to be presented to the screen.

The other film or band M is, in the particular construction shown, drawn continually across the light opening in the table 10 and the frame 11, and for this purpose sprocket wheels 33 are provided and a spring-actuated presser or guard 34 cooperates with the sprocket wheels 33 to hold the subject carrier M in engagement with the teeth of the sprocket wheels. A spring 35 holds the guard 34 against the sprocket wheels, the guard being pivoted at 36 and being provided with a handle 37 to facilitate moving the guard 34 into operative relation to the sprocket wheels 33, as is necessary for example in threading the film or band into the apparatus.

The light from the light house C, before

'passing through a subject carrier may, if desired, be passed through a screen so that different color effects may be produced on the screen or screens. In the drawings, a color screen is shown for the purpose of illustration, in connection with the film or band M, which may be in the form of a stencil, and consequently the reading matter displayed in connection with the picture shown on the film F will be colored in accordance with the manner in which the light passes through the color screen I. It will be understood, of course, that the apparatus will function without the use of this color screen, if desired, or if desired, a stationary color screen may be used in place of the continually movable one shown in the drawings. The revolving color screen shown in the accompanying drawings includes upper and lower plates or disks 40 and 41 which are connected by means of a plurality of color screens or plates of colored transparent material, such for example, as glass. In the construction shown, three of these plates 42, 43 and 44 are provided which are arranged in such a manner that two of the plates or screens 42 and 43 are in substantially the same plane and the other screen 44 extends substantially at right angles to the other two screens near the adjacent edges thereof. The color screen is revolvable about a vertical axis which is placed at one side of the path of light from the condenser D' to the mirror or reflector K so that when the color screen is in the position shown in Fig. 4, the light will pass through the plate or screen 44 only. The two plates or disks 40 and 41 are preferably connected by an upright shaft 47, the upper end of which is journalled in a bracket or extension 46 rigidly mounted on a fixed part of the machine, and the lower part of which extends downwardly into the gear case P and is driven by suitable mechanism to be described. By examination of Fig. 7, it will be obvious that many different combinations of colors will be obtained while the color screen I rotates about its vertical axis and when the plates are in the positions indicated in dotted lines in Fig. 7, all of the plates will be out of the path of light, so that clear or white light passes to the subject carrier.

The mechanism imparting movement to the sprocket wheels 27 and 33 and to the color screen I is driven by means of the motor Q. The motor is mounted on a base 50 which is preferably provided with an oil compartment or reservoir 51, and a pair of wicks 52 and 53 extend into the oil in the reservoir 51 and extend upwardly through holes in the bearing standards or supports 54 and 55 of the motor and terminate at the motor shaft 56. The oil reservoir 51 is preferably made of such large size that the motor will run practically indefinitely without requiring oiling. The base 50 of the motor also has an extension 58, on which the gear case P is mounted, and the gear case P preferably also constitutes an oil reservoir so that the parts contained therein operate in oil.

The gearing through which movement is transmitted from the motor to the sprocket wheels and the color screen may be of any suitable construction, that shown being constructed as follows, see particularly Figs. 5 and 6.

60 represents a main drive shaft of the transmission mechanism which is suitably connected with the motor shaft 56, preferably by means of a clutch 61 of any suitable or desired construction. The shaft 60 is suitably journalled at one end in the gear case P, a bearing 62 being formed on the gear case, and at the other end of the shaft 60 is journalled in a plate 63, which also serves to close an opening into the gear case P. A worm 64 is secured on the shaft 60 and meshes with a worm gear 66 which is mounted on a longitudinally extending shaft 67, see Fig. 6. The shaft 67 is mounted on bearings formed on brackets 68 and 69 which may, if desired, be formed integrally with the gear case P or rigidly secured thereto. The other end of the shaft 67 is provided with a worm 71 which meshes with a worm gear 72 mounted on a shaft 73 arranged transversely of the gear case and one end of the shaft 73 extends through the gear case, and the sprocket wheel 33 is mounted on the outer end thereof. The shaft 73 is also provided with a bevelled gear 75 suitably secured thereto which meshes with a bevelled pinion 76 secured on the downwardly extending shaft or trunnion 47 of the light screen I.

Motion is transmitted from the shaft 73 to the intermittent sprocket 27 by means of a Geneva movement, which includes a wheel or disk 80 secured on the shaft 73 and provided with a pin 81 which is adapted to cooperate with slots 82 formed in a star wheel 83. The peripheral faces of the star wheel 83 are adapted to engage with a disk or cam 85 secured to or formed integral with the disk 80 and which is provided at 86 with a depression permitting the star wheel 83 to be turned when engaged by the pin 81. The star wheel 83 is mounted on a shaft 87, on which the intermittent sprocket 27 is mounted. By means of this construction it will be seen that both of the sprocket wheels for imparting movement to the subject carriers and the light screen are driven from the shaft 73 so that by a proper arrangement of the subject carriers F and M on their sprocket wheels, the operation of the two subject carriers in synchronism with each other is assured.

The sprockets 27 and 33 are preferably adjustably held on the shafts 87 and 73 respectively by means of suitable clutch devices, not shown, and knurled knobs or handles 90 and 91 are preferably provided which are connected with the sprocket wheels so that the sprocket wheels may be turned, if desired, independently of the shafts on which they are mounted, to adjust the films as may be desired.

By mounting all of the transmission mechanism in an inclosed case P, this case may be provided with sufficient oil to enable the machine to run indefinitely without lubrication. When the machine is used as an advertising device, it may be started at any time and will continue to run indefinitely without further attention, and since the two films or bands are driven by the same mechanism, each picture of the film F will always be presented at the same time as the corresponding reading matter on the film or stencil M, so that the pictures and reading matter will never get out of synchronism.

The arrangement of the apparatus so that one reflection of the light passing through the subject carrier is obtained is desirable, in that this arrangement does not reduce materially the amount of light projected on the screen, and at the same time makes it possible to obtain a projection of sufficient size without requiring a large and cumbersome case for the apparatus.

I claim as my invention:

1. In a projection apparatus, including a source of light, the combination of a plurality of projecting devices, a subject carrier for each of said projecting devices, means arranged in operative relation to each of said projecting devices for holding the portion of the subject carrier which is being projected in a substantially horizontal position, means for reflecting light simultaneously to both of said subject carriers from said source of light, and a reflector for each projection device which reflects the light which has passed through said subject carrier into a substantially horizontal direction.

2. A projection apparatus having means for projecting a subject carrier, a plurality of color screens rotatably mounted to swing into and out of the entire path of light of the projection apparatus to impart color to the picture projected from said subject carrier, said screens being so arranged that light will pass through each of said screens singly at intervals during the rotation of said screens and also through pairs of screens during portions of said rotation.

3. A projection apparatus having means for projecting a subject carrier, a plurality of color screens rotatably mounted to swing into and out of the entire path of light of the projection apparatus to impart color to the picture projected from said subject carrier, said screens being so arranged that light will pass through each of said screens singly at intervals during the rotation of said screens and also through more than one screen during portions of said rotation, said screens being so spaced that during a portion of said rotation all of said screens are out of the path of light.

4. A projection apparatus having means for projecting a subject carrier and having three substantially flat color screens so arranged relatively to each other that the three screens are arranged substantially at right angles to each other about a common axis, said screens being rotatable about said axis and said axis being arranged at one side of the path of light and adapted to swing entirely across said path of light to said subject carrier.

5. A projection apparatus having three substantially flat color screens so ararnged relatively to each other that two of said screens lie in substantially the same plane and the third screen extends substantially at right angles to said plane, said screens being revolvable about an axis arranged at one side of the path of light and adapted to extend across the path of light.

HARVEY N. OTT